(12) United States Patent
Lemmers et al.

(10) Patent No.: US 8,319,481 B2
(45) Date of Patent: Nov. 27, 2012

(54) POLE SHIFTING GENERATOR

(75) Inventors: Glenn C. Lemmers, Loves Park, IL (US); Darin R. Morman, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1485 days.

(21) Appl. No.: 11/645,438

(22) Filed: Dec. 26, 2006

(65) Prior Publication Data

US 2008/0150494 A1   Jun. 26, 2008

(51) Int. Cl.
*H02P 9/10* (2006.01)
*H02P 11/00* (2006.01)

(52) U.S. Cl. ............................................. 322/89; 322/59

(58) Field of Classification Search ..................... 322/89, 322/90, 86, 24, 47, 59, 99; 310/179
See application file for complete search history.

(56) References Cited

U.S. PATENT DOCUMENTS

| | | |
|---|---|---|
| 2,385,669 A | 9/1945 | Whiting |
| 2,467,751 A | 4/1949 | Hoover |
| 2,474,647 A | 6/1949 | Binney |
| 2,474,648 A | 6/1949 | Binney |
| 2,525,404 A | 10/1950 | Dolan |
| 2,625,674 A | 1/1953 | Petit |
| 2,659,045 A | 11/1953 | Rona |
| 2,664,539 A | 12/1953 | Petit |
| 2,966,623 A | 12/1960 | Mishkin |
| 3,274,412 A | 9/1966 | Fisher |
| 3,378,757 A | 4/1968 | Potter |
| 4,272,706 A | 6/1981 | Somerville |
| 4,454,465 A | 6/1984 | Greene |
| 4,866,364 A | 9/1989 | Chiarion |
| 4,887,020 A | 12/1989 | Graham |
| 4,982,123 A * | 1/1991 | Raad .......................... 310/68 D |
| 5,036,267 A * | 7/1991 | Markunas et al. ............. 322/10 |
| 5,097,195 A * | 3/1992 | Raad et al. ...................... 322/10 |
| 5,168,187 A * | 12/1992 | Baer et al. .................. 310/49.12 |
| 5,473,227 A * | 12/1995 | Arnaud et al. ................ 318/139 |
| 5,777,459 A | 7/1998 | Bansal |
| 5,850,138 A * | 12/1998 | Adams et al. ................... 322/68 |

(Continued)

FOREIGN PATENT DOCUMENTS

JP 2005185006 12/2003

(Continued)

OTHER PUBLICATIONS

UK Search Report, dated Apr. 23, 2008.

*Primary Examiner* — Nicholas Ponomarenko
(74) *Attorney, Agent, or Firm* — Carlson, Gaskey & Olds, PC (57) ABSTRACT

An apparatus and method generate electric current within a specified frequency range from a rotor operating within a broad range of rotational speeds by reducing the number of poles of the generator at higher rotational speeds. At higher rotational speeds, the generator circuit is altered so that a flow of current through half of a plurality of windings is reversed and the polarity in the said half of the windings is reversed. Two adjacent windings with the same polarity create a single pseudo pole, which effectively reduces the number of poles in the generator by half, and reduces the frequency of the electric current produced by the generator. Thus, the generator is operable to produce current within a specified frequency range from a rotor operating within a broad range of rotational speeds.

15 Claims, 7 Drawing Sheets

U.S. PATENT DOCUMENTS

| | | | |
|---|---|---|---|
| 6,018,200 A | 1/2000 | Anderson | |
| 6,628,104 B2 * | 9/2003 | Malicki et al. | 322/59 |
| 6,788,031 B2 * | 9/2004 | Pendell | 322/44 |
| 7,078,826 B2 | 7/2006 | Xu et al. | 290/52 |
| 7,102,304 B2 * | 9/2006 | Sebille et al. | 318/108 |
| 7,122,994 B2 * | 10/2006 | Anghel et al. | 322/60 |
| 7,541,784 B2 * | 6/2009 | Davis | 322/22 |
| 7,571,045 B2 * | 8/2009 | Muramatsu et al. | 701/100 |
| 7,795,830 B2 * | 9/2010 | Johnson | 318/432 |
| 7,969,122 B2 * | 6/2011 | Lemmers et al. | 322/59 |

FOREIGN PATENT DOCUMENTS

| | | |
|---|---|---|
| JP | 2006-296120 | 10/2006 |
| WO | 0143273 | 6/2001 |

* cited by examiner

POLE SHIFTING GENERATOR

BACKGROUND OF THE INVENTION

The invention relates to an electric generator, and more specifically to a pole shifting electric generator.

A typical gas turbine engine has a high-pressure (HP) spool and a low-pressure (LP) spool. The LP spool typically operates across a broader range of rotational speeds, and the HP spool typically operates within a narrower range of rotational speeds.

Vehicles incorporating gas turbine engines, such as aircraft, require significant amounts of electric power for operation. In some aircraft applications, a generator driven at these speeds would produce electric current within a frequency range of 360-800 Hz. This frequency range is acceptable (i.e., a frequency ratio of 2.22:1). The rotational speed of an HP spool extends across a speed ratio of about 2.22:1. Therefore, the high-pressure (HP) spool of a turbine engine is typically used to generate electricity for an aircraft system. However, due to modern aircraft efficiency requirements, the demand for electric power is increasing beyond the power extraction potential of the HP spool.

The rotational speed of an LP spool varies over a much broader range, e.g. a speed ratio of 4.44:1. Although power extraction from the LP spool is possible, the broader range of rotational speeds of the LP spool would produce current whose frequency exceeds the 360-800 Hz range at higher speeds. When the LP spool is operating at lower speeds (e.g. across a 2.22:1 speed ratio), the LP spool is operable to produce current within the acceptable 360-800 Hz range. However when the LP spool operates in the higher range, which exceeds the 2.22:1 speed ratio, the frequency of the current produced by the generator would exceed the desired 360-800 Hz range. Of course, all of the mentioned ranges are examples only.

If aircraft circuitry designed for 360-800 Hz electrical current receives current with a frequency that exceeds this range, the aircraft circuitry can be damaged. Alternatively, aircraft circuitry can be designed to accommodate a wider frequency range of current, but this would result in an unacceptable increase in weight and volume of the circuitry.

SUMMARY OF THE INVENTION

In one disclosed embodiment, an electric generator is installed on a device that operates across a wide range of speeds. As disclosed, it may be on a low-pressure (LP) spool of a gas turbine engine, where the LP spool operates within a broad range of rotational speeds. The generator, comprising a plurality of windings, is excited by a first exciter field. During a first, lower speed range each pole of the generator has two adjacent poles with opposing polarity. During a second, higher speed range, a second exciter field is activated to alter the generator circuit so that a flow of current through half of the plurality of windings is reversed. For each winding in which the flow of current is reversed, the polarity is also changed. The result is that each winding of the generator has a first adjacent winding with the opposite polarity and a second adjacent winding with the same polarity. Two adjacent windings with the same polarity form a single pseudo pole, which effectively reduces the number of poles in the rotor in half, and reduces the frequency of the electric current produced by the generator, enabling the generator to continue producing electricity within a desired frequency range while operating at higher rotational speeds.

These and other features of the present invention can be best understood from the following specification and drawings, the following of which is a brief description.

DETAILED DESCRIPTION OF THE PREFERRED EMBODIMENT

Figure 1:
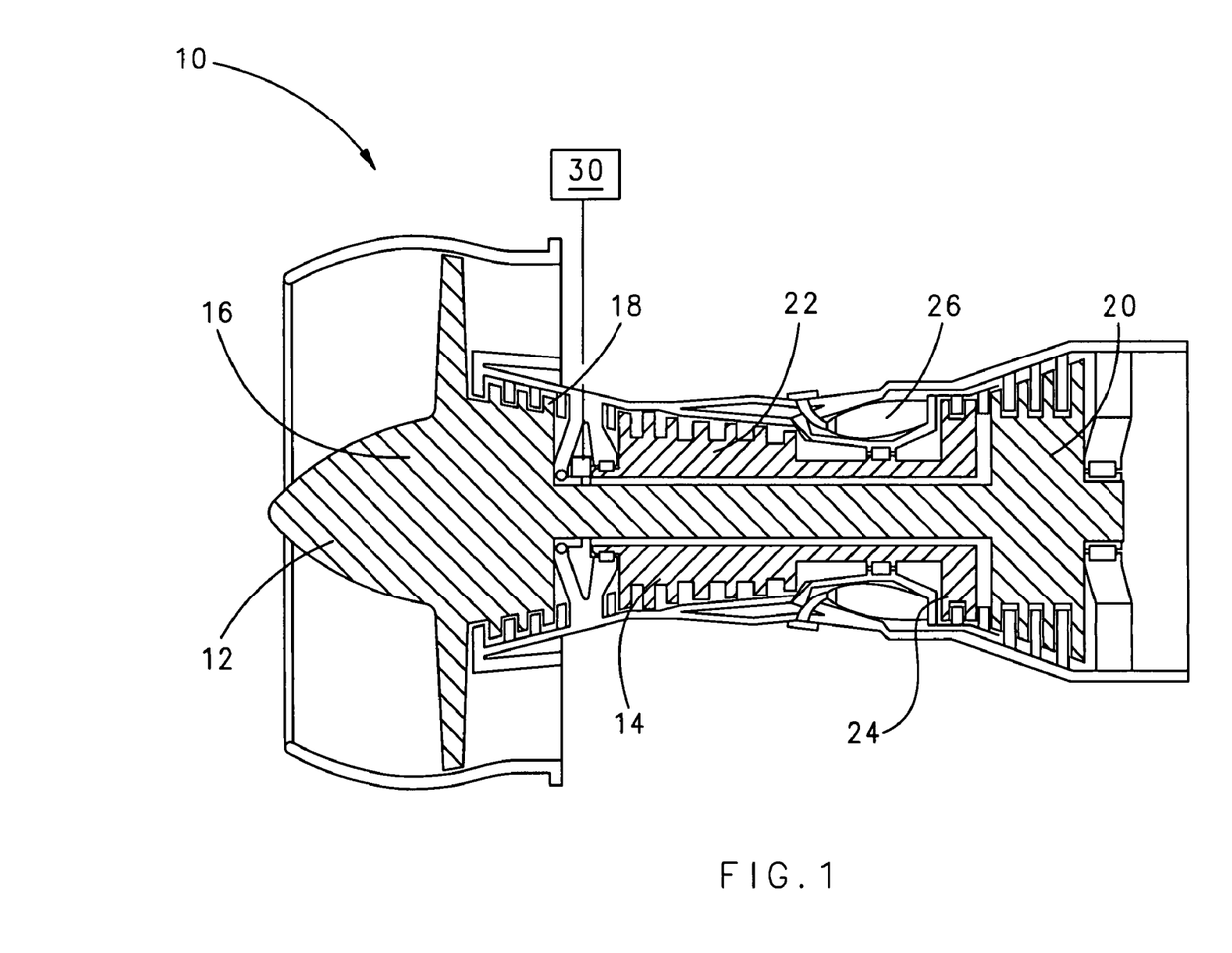
FIG. 1 shows a turbine engine.

FIG. 1 illustrates an example gas turbine engine 10. The engine 10 comprises a low pressure (LP) spool 12, and a high pressure (HP) spool 14. The LP spool 12 comprises a fan 16, a low pressure compressor 18, and a low pressure turbine 20. The HP spool 14 comprises a high pressure compressor 22 and a high pressure turbine 24. A combustor 26 is adjacent to the HP spool 14. The fan 16 sends air through the low pressure compressor 18, which sends air through the high pressure compressor 22. The combustor 26 injects fuel into the air, which is burned, producing heat and driving both the high pressure turbine 24 and the low pressure turbine 20. A generator 30 is shown coupled to the LP spool 12, however the location of generator 30 is an example location, and the generator 30 could be coupled to the LP spool 12 in other locations.

Figure 2:
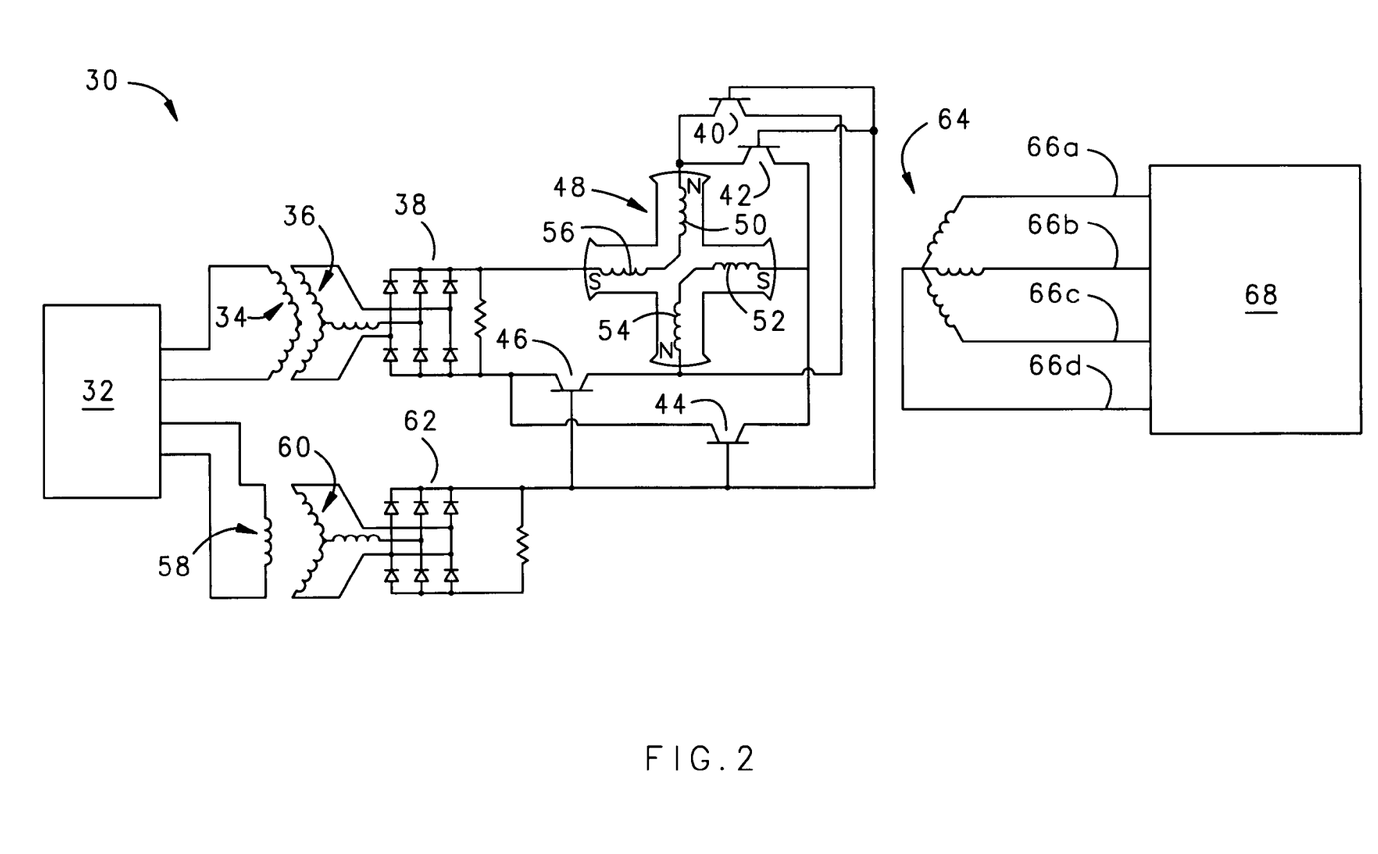
FIG. 2 schematically illustrates a circuit of a generator according to one embodiment of the present invention, during a first, lower LP spool rotational speed range.

FIG. 2 schematically illustrates a generator 30, according to one embodiment of the present invention, that could be coupled to an LP spool of a gas turbine engine. A generator control unit 32 provides current to a first exciter stator 34, which creates a magnetic field. The magnetic field, or first exciter field, induces an alternating current in a first exciter armature 36. The exciter armature 36 sends three phases of AC current to a first set of rectifiers 38, which convert the three phases of AC current to DC current. This DC current flows from the set of rectifiers 38 through a plurality of windings 50, 52, 54, and 56. The windings are driven to rotate with the LP spool, so that the current flowing through the windings induces a current in a stationary main stator 64. The windings and an associated rotor may be connected through appropriate gearing to be driven with the LP spool. From the main stator 64, current flows to a load 68 through phases 66a, 66b, and 66c and through neutral connection 66d.

Transistors 40, 42, 44, and 46 perform a switching operation in the generator 30. In one example, the transistors could be MOSFETs. When the LP spool is operating within a first, lower range of rotational speeds, transistor switches 40 and 44 are closed, and transistor switches 42 and 46 are open. In this switching configuration, current enters a rotor 48 through the winding 56 with a south polarity and exits the rotor 48 through the winding 50 with a north polarity. The current then reenters the rotor 48 through the winding 54 with a north polarity and exits the rotor 48 through the winding 52 with a south polarity. The first range of rotational speeds may extend across a speed ratio of 2.22:1. When operating within this first range of rotational speeds, the generator produces a current within a desired frequency range. An example desired frequency range is 360-800 Hz. During this first range of rotational speeds, a second exciter stator 58, a second exciter armature 60, and a second set of rectifiers 62 are all inactive.

Figure 3:
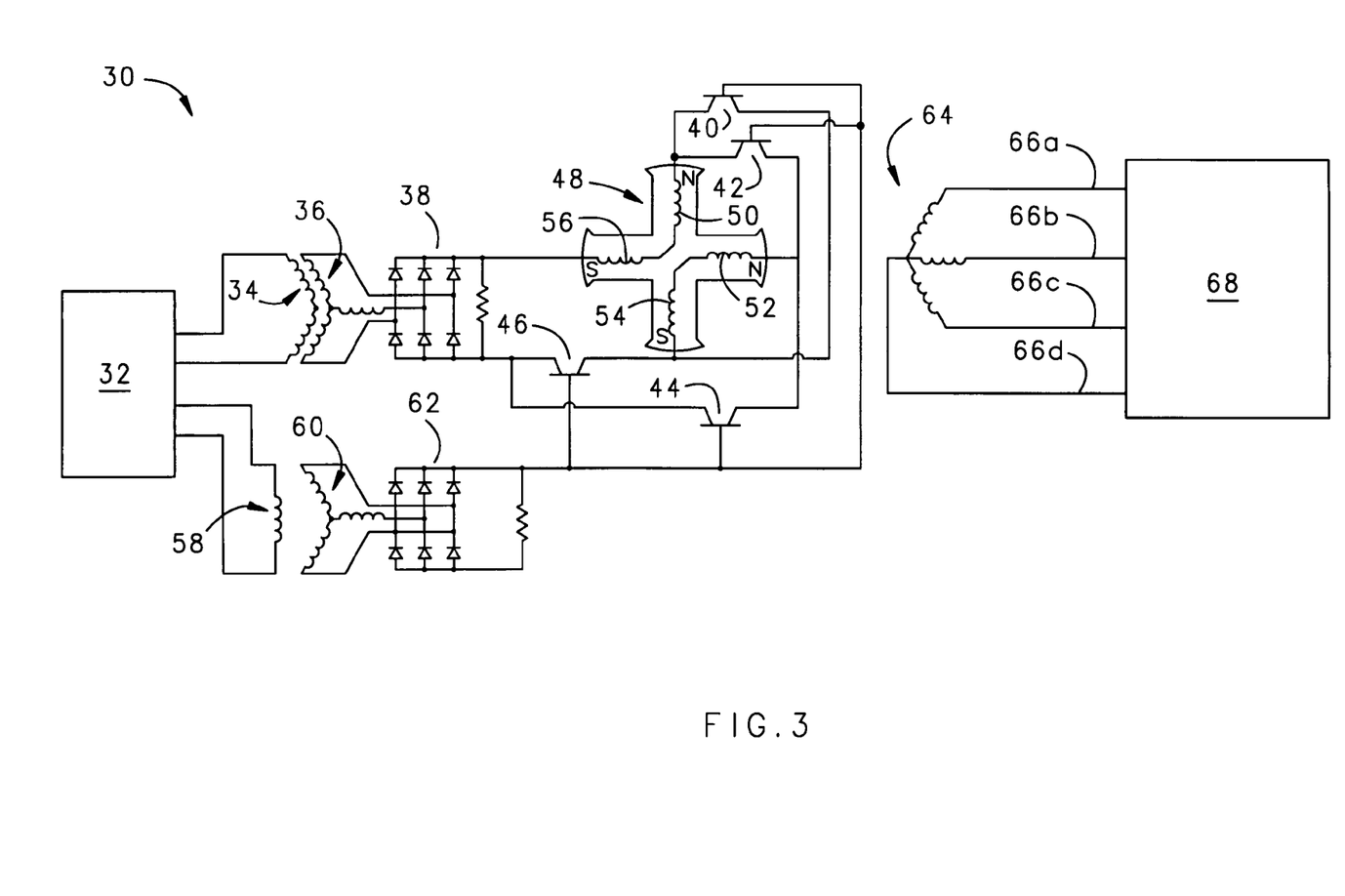
FIG. 3 illustrates the embodiment of FIG. 2 during a second, higher LP spool rotational speed range.

As shown in FIGS. 2 and 3, the stationary components are the generator control unit 4, the exciter stators 34 and 58, the main stator 64, and the aircraft load 68. The exciter armatures 36 and 60, the rectifiers 38 and 62, the transistors 40, 42, 44, and 46, and the windings 50, 52, 54, and 56 are all driven by the LP spool to rotate while the generator is operating. Current is able to flow into the rotating windings because the stationary exciter stators 34 and 58 induce current in the rotating exciter armatures 36 and 60. Furthermore, current is able to flow to the aircraft load 68 because the rotating windings induce a current in the stationary main stator 64.

FIG. 3 shows the generator of FIG. 2 during a second, higher range of rotational speeds. The second range of rotational speeds may extend across a rotational speed ratio of 4.44:1. As the rotational speed of the LP spool increases, the frequency of the current produced by the generator 30 also increases, and can exceed the desired frequency range. When generator control unit 32 detects that the rotational speed of the LP spool has entered the second range of rotational speeds, the second exciter stator 58 is activated. When the generator control unit 32 provides current to the second exciter stator 58, a magnetic field, or second exciter field, is created. The second exciter field only performs a switching operation in the generator 30 and does not actually provide current to the windings 50, 52, 54, or 56.

The second exciter field induces an alternating current in the second exciter armature 60. The second exciter armature 60 sends three phases of AC current to a second set of rectifiers 62, which convert the three phases of AC current to DC current. This DC current alters the switching configuration of the generator 30 so that transistors 40 and 44 are opened, and transistors 42 and 46 are closed. In this switching configuration, current still enters the rotor 48 through the winding 56 with a south polarity and exits the rotor 48 through the winding 50 with a north polarity, however due to the change in switching configuration, current now reenters the rotor 48 through the winding 52 which now has a north polarity, and exits the rotor 48 through the winding 54, which now has a south polarity.

The polarity of each winding 50, 52, 54, and 56 is determined by the orientation of the winding. As is well-known in the art, one can orient a winding so that when an electric current flows through the winding a desired polarity is created in the winding. When the flow of current through a winding is reversed, the polarity of the winding is also reversed. When adjacent windings have the same polarity, the generator 30 treats them as a single, pseudo pole. This effectively reduces the number of poles in the generator by half. The reduction in the quantity of poles simulates a lower rotational speed, and therefore reduces the frequency of current produced by the generator. Even though the LP spool is rotating within a range of rotational speeds that extends across a 4.44:1 speed ratio, with the pseudo poles it is effectively operating within a range of rotational speeds that extends across a 2.22:1 speed ratio, and thus still producing current within the desired frequency range.

Figure 4:
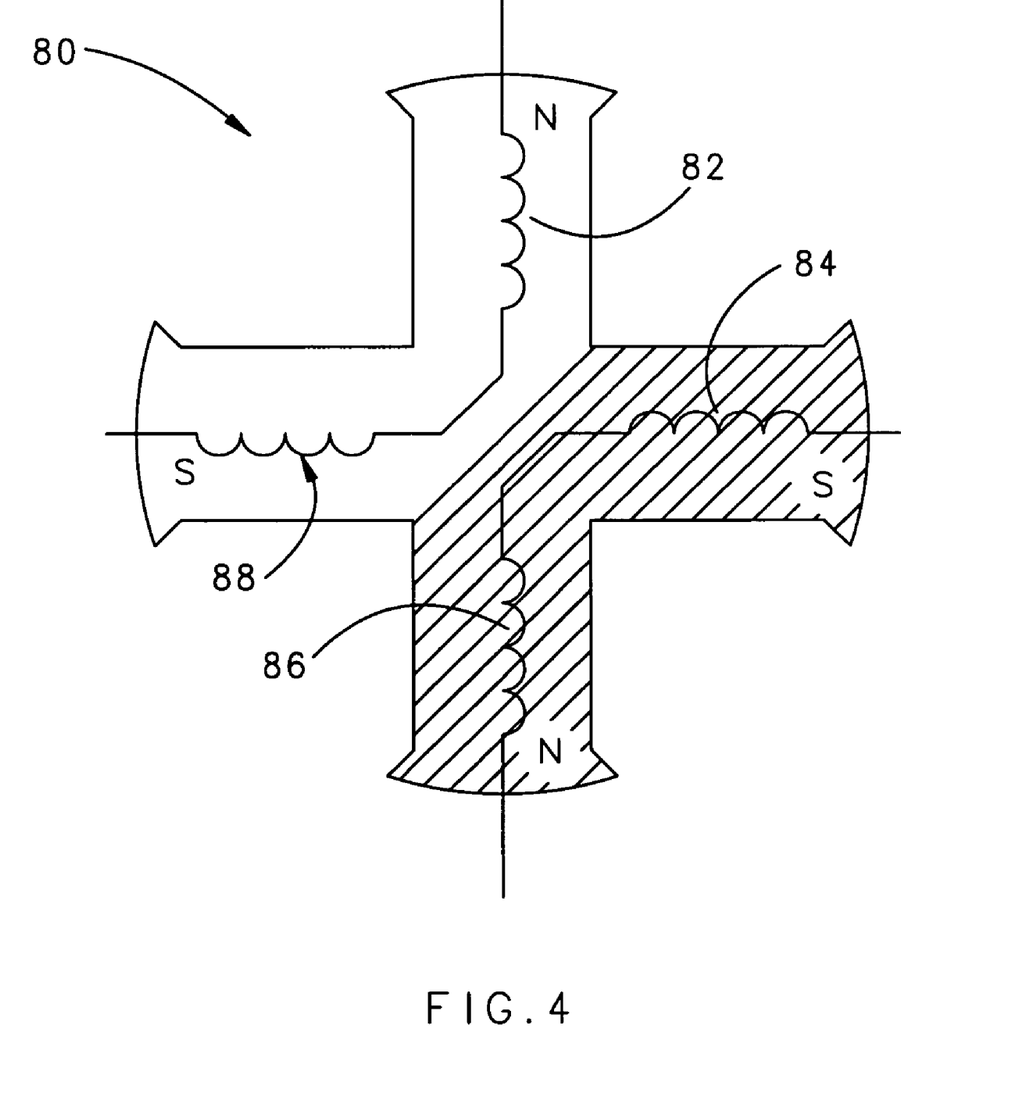
FIG. 4 illustrates a four pole rotor according to one embodiment of the present invention during the first, lower LP spool rotational speed range.

FIG. 4 illustrates a rotor 80 having four windings 82, 84, 86, and 88. FIG. 4 illustrates the rotor 80 during the first, lower range of rotational speeds of the LP spool. As shown in FIG. 4, the windings have alternating polarity, with each winding having an adjacent winding with opposite polarity. For example, winding 84 has a south polarity, and adjacent windings 82 and 86 have a north polarity. This results in the rotor 80 having four distinct poles.

Figure 5:
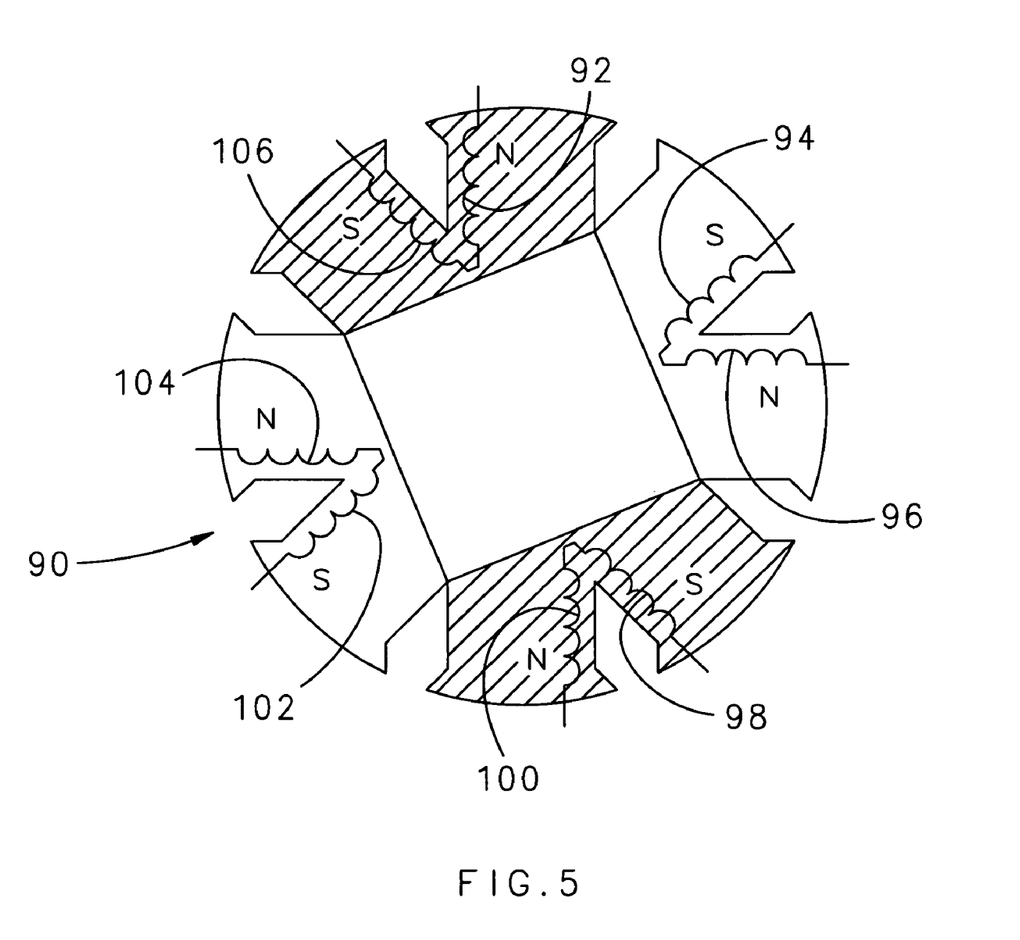
FIG. 5 illustrates an eight pole rotor according to one embodiment of the present invention during the first, lower LP spool rotational speed range.

Similarly, as shown in FIG. 5, the rotor 90 has eight windings 92, 94, 96, 98, 100, 102, 104, and 106. During the lower rotational speeds of the LP spool, these windings also have alternating polarity, with each winding having an adjacent winding with opposite polarity. For example, winding 94 has a south polarity, and adjacent windings 92 and 96 have a north polarity. This results in the rotor 90 having eight distinct poles.

Figure 6:
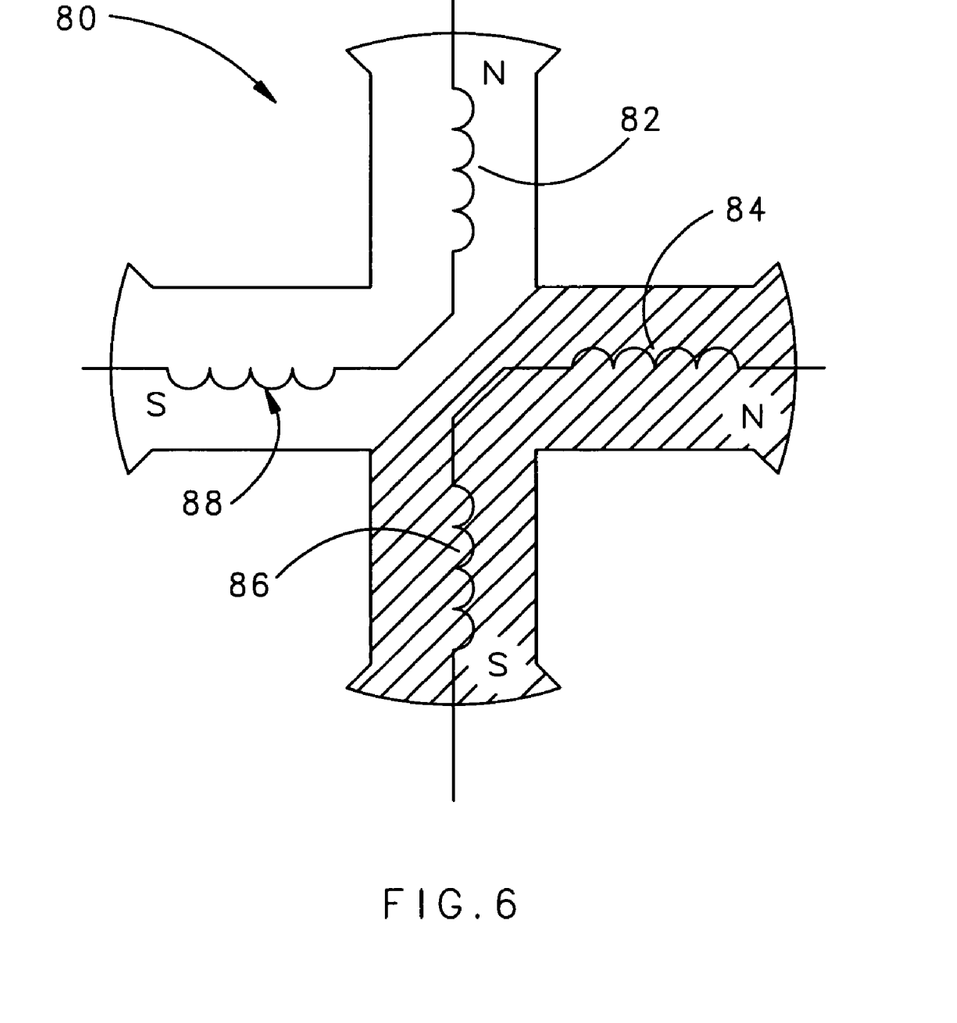
FIG. 6 illustrates the four pole rotor of FIG. 4 during the second, higher LP spool rotational speed range.

FIG. 6 illustrates the rotor 80 and windings 82, 84, 86, and 88 of FIG. 4 during the second, higher rotational speed range of the LP spool. A second exciter field (not shown) has reversed the direction of the flow of current through windings 84 and 86, which has also reversed the polarity of windings 84 and 86. Now each winding no longer has two adjacent windings of opposite polarity. Each winding has a first adjacent winding with the opposite polarity, and a second adjacent winding with the same polarity. When adjacent poles have the same polarity, they become a single pseudo pole. The four pole rotor 80 becomes a pseudo two pole rotor, as adjacent windings 82 and 84 both have a north polarity, and adjacent windings 86 and 88 both have a south polarity.

Figure 7:
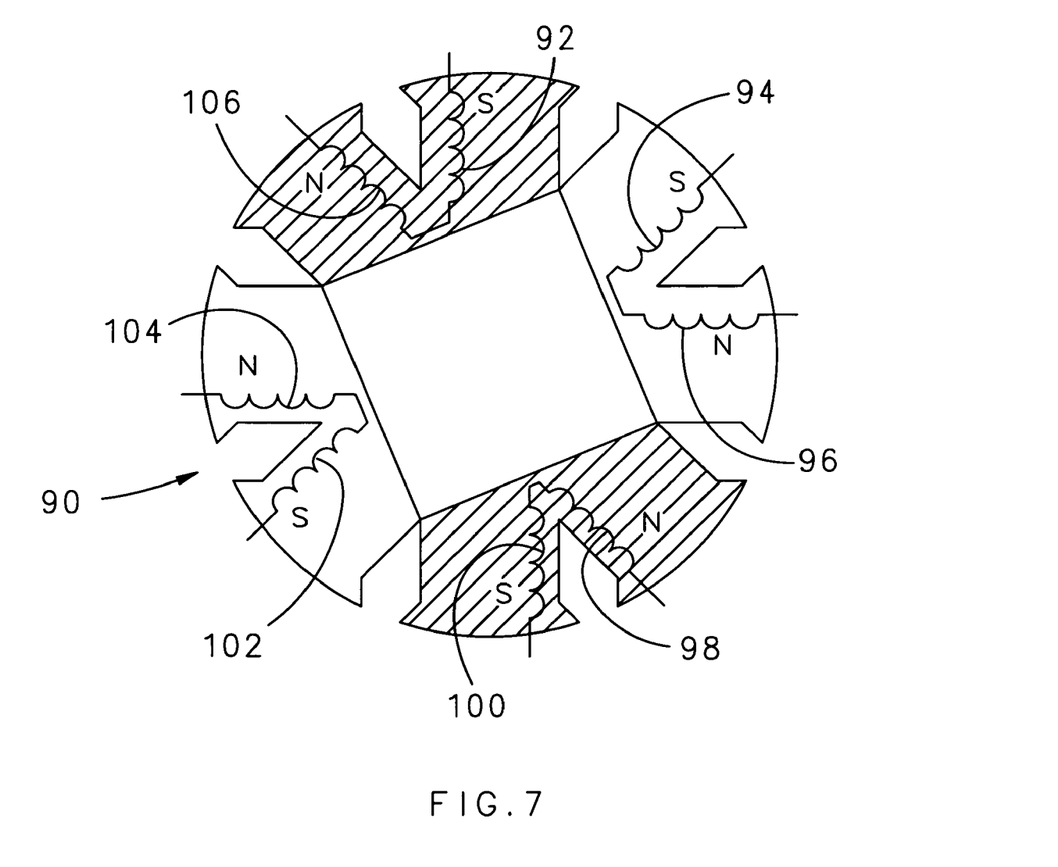
FIG. 7 illustrates the eight pole rotor of FIG. 5 during the second, higher LP spool rotational speed range.

FIG. 7 illustrates the rotor 90 and windings 92, 94, 96, 98, 100, 102, 104, and 106 of FIG. 5 during the higher rotational speed range of the LP spool. A second exciter field (not shown) has reversed the polarity of windings 92, 98, 100, and 106. The eight pole rotor 90 becomes a pseudo four pole rotor, as the number of poles is effectively reduced in half due to each winding having a first adjacent winding with the opposite polarity and a second adjacent winding with the same polarity.

This application extends to any generator comprising 4*N windings, where N is a positive, even integer. Also, while disclosed as associated with an LP spool, it may have application in other generator applications that operate over a broad speed range.

In addition, although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An electric generator comprising:
   a plurality of rotor windings to be driven to rotate by a source;
   a stator positioned adjacent to the plurality of rotor windings;
   at least one switch, wherein the at least one switch controls a flow of current through the rotor windings; and
   a control, wherein the control is operable to control the at least one switch in a first mode at a first speed range of the rotor windings and in a second mode at a second speed range of the rotor windings to generate current within a desired frequency range.

2. The electric generator of claim 1, wherein in the second mode, the control reverses the polarity in at least some of the plurality of rotor windings.

3. The electric generator of claim 2, wherein the polarity of the plurality of rotor windings is reversed by reversing the direction of the flow of current through the rotor windings.

4. The electric generator as recited in claim 3, wherein the direction of the flow of current is reversed in half of the plurality of rotor windings in the generator.

5. The electric generator as recited in claim 1, further comprising:
   a first exciter field, wherein the first exciter field is operable to create a polarity in the plurality of rotor windings; and
   a second exciter field, wherein the second exciter field is coupled to the at least one switch, and wherein the control engages the second exciter field in the second mode to change the switching configuration of the at least one switch to change the polarity in at least some of the plurality of rotor windings.

6. The electric generator as recited in claim 1, wherein when the generator is operating in the first mode at the first speed range, adjacent rotor windings have opposite polarity.

7. The electric generator as recited in claim 6, wherein when the generator is operating in the second mode at the second speed range each rotor winding has a first adjacent rotor winding with the opposite polarity and a second adjacent rotor winding with the same polarity.

8. The electric generator as recited in claim 1, wherein the source is an LP spool of a gas turbine engine.

9. A vehicle comprising:
   a load;
   an electric generator to supply power to the load, the electric generator including:
      a plurality of rotor windings to be driven to rotate by a source;
      a stator positioned adjacent to the plurality of rotor windings;
      at least one switch, wherein the at least one switch controls a flow of current through the rotor windings; and
      a control, wherein the control is operable to control the at least one switch in a first mode at a first speed range of the rotor windings and in a second mode at a second speed range of the rotor windings to generate current within a desired frequency range.

10. The vehicle of claim 9, wherein in the second mode, the control reverses the polarity in at least some of the plurality of rotor windings.

11. The vehicle of claim 10, wherein the polarity of the plurality of rotor windings is reversed by reversing the direction of the flow of current through the rotor windings.

12. The vehicle as recited in claim 11, wherein the direction of the flow of current is reversed in half of the plurality of rotor windings in the generator.

13. The vehicle as recited in claim 9, further comprising:
   a first exciter field, wherein the first exciter field is operable to create a polarity in the plurality of rotor windings; and
   a second exciter field, wherein the second exciter field is coupled to the at least one switch, and wherein the control engages the second exciter field in the second mode to change the switching configuration of the at least one switch to change the polarity in at least some of the plurality of rotor windings.

14. The vehicle as recited in claim 9, wherein when the generator is operating in the first mode at the first speed range, adjacent rotor windings have opposite polarity.

15. The vehicle as recited in claim 14, wherein when the generator is operating in the second mode at the second speed range each rotor winding has a first adjacent rotor winding with the opposite polarity and a second adjacent rotor winding with the same polarity.

\* \* \* \* \*